United States Patent [19]
Arai et al.

[11] Patent Number: 5,587,772
[45] Date of Patent: Dec. 24, 1996

[54] IMAGE FORMING APPARATUS HAVING IMAGE SIGNAL DISCRIMINATION DEVICE

[75] Inventors: Kazuhiko Arai; Yasuhiro Oda; Masahiko Kubo; Masayo Higashimura; Kazuhiro Iwaoka; Takayuki Yamashita, all of Nakai-machi, Japan

[73] Assignee: Fuji Xerox Co., Ltd., Tokyo, Japan

[21] Appl. No.: 543,911

[22] Filed: Oct. 17, 1995

[30] Foreign Application Priority Data

Dec. 12, 1994 [JP] Japan .................... 6-331437

[51] Int. Cl.$^6$ .................................. G03G 15/04
[52] U.S. Cl. .......................... 355/208; 358/458
[58] Field of Search ........................... 355/208, 214, 355/69, 228, 465, 246; 358/455, 458, 456, 457, 280, 283, 298

[56] References Cited

U.S. PATENT DOCUMENTS

| | | | |
|---|---|---|---|
| 4,926,268 | 5/1990 | Kawamura et al. | 358/458 |
| 5,331,432 | 7/1994 | Sawada et al. | 358/465 |
| 5,436,644 | 7/1995 | Motoi et al. | 347/256 |
| 5,473,415 | 12/1995 | Hayashi et al. | 355/208 |
| 5,495,341 | 2/1996 | Kawana et al. | 358/298 |
| 5,502,550 | 3/1996 | Hori et al. | 355/246 |

FOREIGN PATENT DOCUMENTS 1-280965  11/1989  Japan .

*Primary Examiner*—Thu A. Dang
*Attorney, Agent, or Firm*—Oliff & Berridge

[57] ABSTRACT

The present invention provides an image forming apparatus having image signal discrimination device for discriminating whether an image density signal belongs to a line image portion or a natural image portion including a halftone image and outputting a discrimination signal, first image density conversion device having a first conversion property for converting the image density signal to a conversion signal and outputting the conversion signal, second image density conversion device having a second conversion property which is different from the first conversion property for converting a range of the image density signal corresponding to a low density portion to a conversion signal indicating a value within a range in which an image is not developed and outputting the conversion signal, selection device for alternately selecting the first and second image density conversion device with a predetermined period, pulse width modulation device for modulating pulse widths of the conversion signals output from the first and second image density signal conversion device and outputting a pulse width modulation signal, pulse width modulation signal period changing device for changing a period of the pulse width modulation signal output from the pulse width modulation device and the period of selection carried out by the selection device in accordance with the discrimination signal output from the image density signal discriminating device, and image formation device for forming an image in accordance with the pulse width modulation signal output from the pulse width modulation device.

20 Claims, 16 Drawing Sheets

|  | 400 lpi | 200 lpi | 141 lpi |
|---|---|---|---|
| HIGH DENSITY LINE IMAGE | GOOD | FAIR | POOR |
| LOW DENSITY LINE IMAGE | FAIR | GOOD | FAIR |
| HIGH DENSITY NATURAL IMAGE | FAIR | GOOD | FAIR |
| LOW DENSITY NATURAL IMAGE | POOR | FAIR | GOOD |
FIG.5
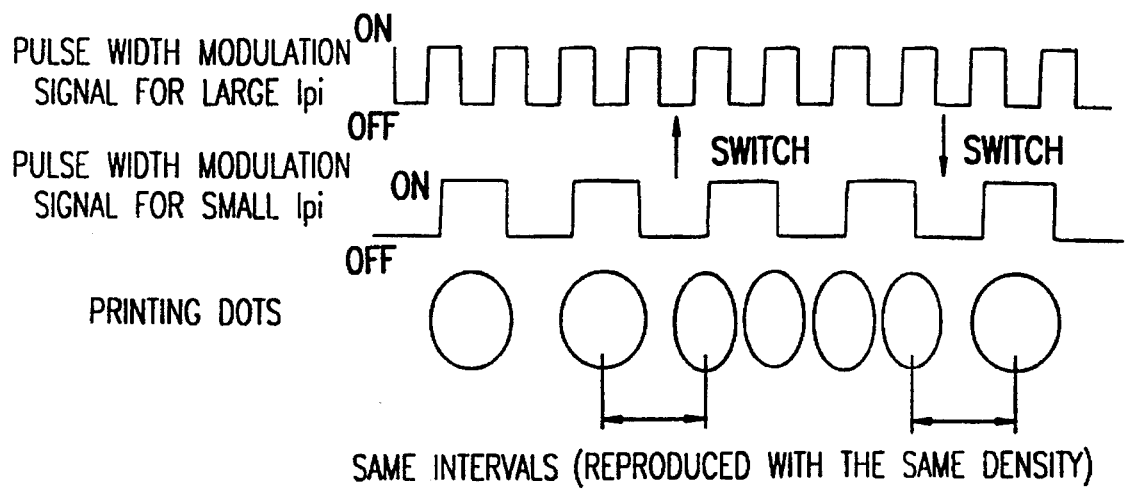
FIG.6a
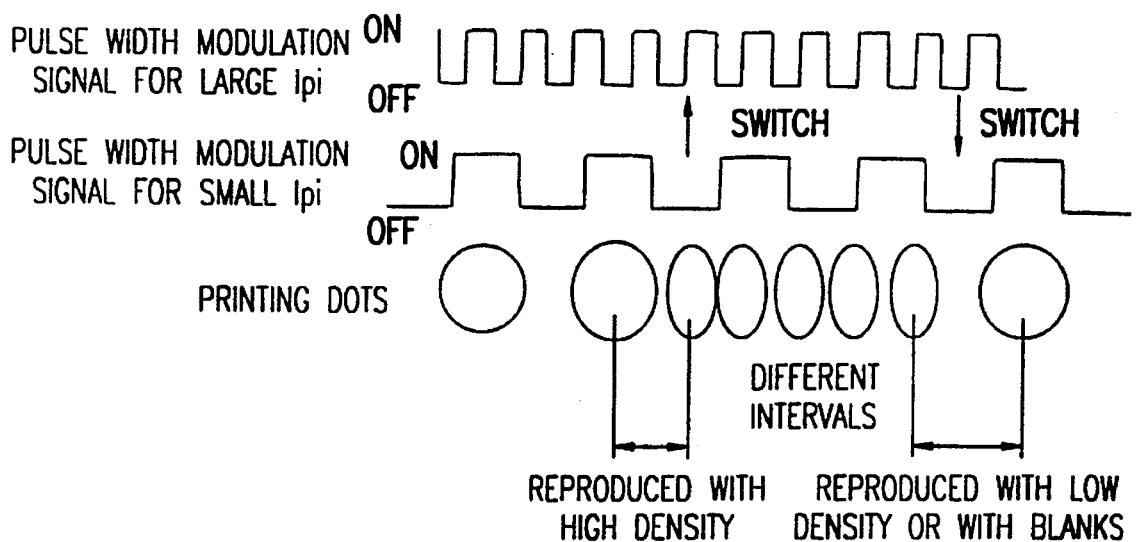
FIG.6b

FIG. 12

LOW-DENSITY LINE IMAGE DENSITY SIGNAL — 121

HIGH-DENSITY LINE IMAGE DENSITY SIGNAL — 122

LUT SELECTION FOR LINE IMAGE — 123

RECORDING DOTS OF LOW-DENSITY LINE IMAGE — 124

RECORDING DOTS OF HIGH-DENSITY LINE IMAGE — 125

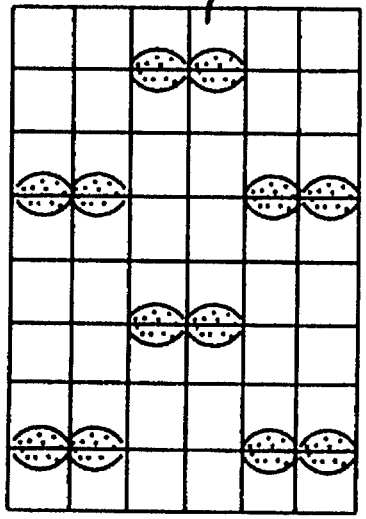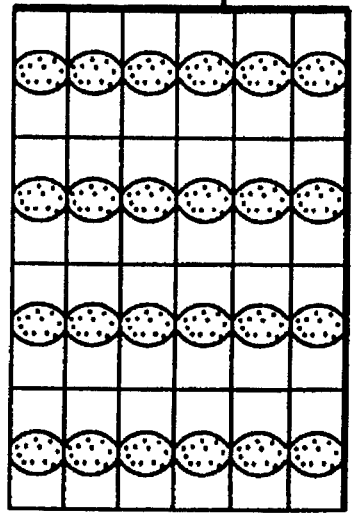
FIG. 13

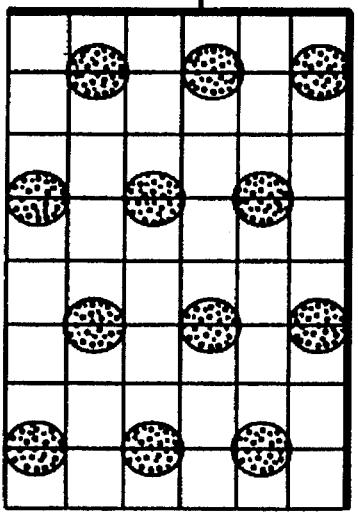
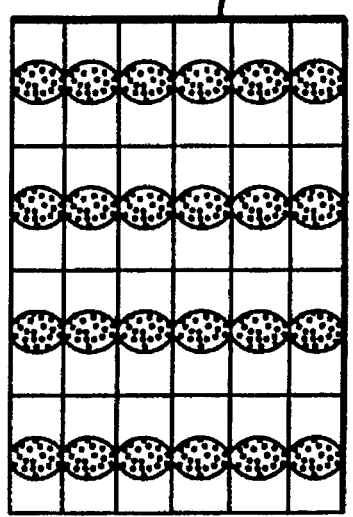
FIG.15

IMAGE FORMING APPARATUS HAVING IMAGE SIGNAL DISCRIMINATION DEVICE

BACKGROUND OF THE INVENTION

1. Field of the Invention

The present invention relates to an image forming apparatus adopting the electrophotographic method which forms an electrostatic image on a light-sensitive medium in accordance with a pulse width modulation signal of an image density signal and develops it with toner to perform image formation.

2. Discussion of the Related Art

In a printer or a copying machine, a digital electrophotographic method is widely used as a method capable of realizing high-speed image formation and providing high image quality. In this method, scanning of the light-sensitive medium with light beam and exposure with pulse width modulation using an analog screen generator or the like for reproducing gradation of an image are generally carried out (See Japanese Patent Application Unexamined Publication No. Hei. 1-280965 (1989), for example).

In this method, an image is formed with fixed spot diameter of the light beam and number of lines from a low density portion to a high density portion of the image density signal. Therefore, contrast of an exposure profile in the low density portion is decreased, thus being analog-like, and besides, since the exposure amount itself is small, reproducing capability of dots or lines and stability in reproduction of gradations and tones depending on environments deteriorate.

To overcome the above problem, the contrast of the exposure profile in the low density portion can be increased by making the spot diameter of the light beam sufficiently small. However, an image-forming optical system converging the light beam and forming a light beam spot on the light-sensitive medium is required excessive preciseness and is very expensive; accordingly, it is of no practical use.

However, in the above-described invention, it is ascertained in the case where a mixture of a line image such as a character image and a natural image including a halftone image is tried to be reproduced, neither line image nor natural image is sufficiently reproduced. This is because the number of recording lines (density) suited for reproduction of the line image differs from the number of recording lines suited for reproduction of the natural image.

SUMMARY OF THE INVENTION

The present invention has been made in view of the above circumstances and has as an object of provision of an image forming apparatus which resolves problems in the conventional art and is an improvement of the above-described previous invention by the inventors of the present invention.

Another object of the present invention is to provide an image forming apparatus improving reproducibility of dots or lines in a low density portion, stability in reproduction of gradations and tones depending on environments and reproducibility of both line image and natural image.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, an image forming apparatus of the present invention comprises image signal discrimination means for discriminating whether an image density signal belongs to a line image portion or a natural image portion including a halftone image and outputting a discrimination signal, first image density conversion means having a first conversion property for converting the image density signal to a conversion signal and outputting the conversion signal, second image density conversion means having a second conversion property which is different from the first conversion property for converting a range of the image density signal corresponding to a low density portion to a conversion signal indicating a value within a range in which an electrostatic latent image is not developed and outputting the conversion signal, selection means for alternately selecting the first and second image density conversion means with a predetermined period, pulse width modulation means for modulating pulse widths of the conversion signals output from the first and second image density signal conversion means and outputting a pulse width modulation signal, pulse width modulation signal period changing means for changing a period of the pulse width modulation signal output from the pulse width modulation means and the period of selection carried out by the selection means in accordance with the discrimination signal output from the image density signal discriminating means, and image formation means for forming an image in accordance with the pulse width modulation signal output from the pulse width modulation means.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings:

FIG. 5 shows an example of results of visual comparison in the cases where a line image and a natural image are reproduced with 400 lpi, 200 lpi and 141 lpi;

FIGS. 6(a) and 6(b) are other illustrations of operations of the image forming apparatus according to the present invention;

FIG. 12 shows recording dots of a line image in the first and second embodiments of the image forming apparatus according to the present invention;

FIG. 13 shows recording dots of of a natural image in the first embodiment of the image forming apparatus according to the present invention;

FIG. 15 shows recording dots of the natural image in the second embodiment of the image forming apparatus according to the present invention;

DETAILED DESCRIPTION OF THE PREFERRED Embodiment

Before describing preferred embodiments, operations of the image forming apparatus according to the present invention are explained.

Figure 2A:
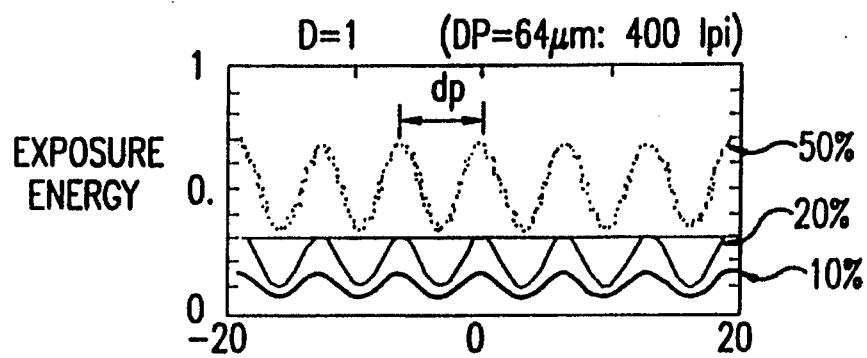
FIGS. 2(a) through 2(c) show operations of the image forming apparatus according to the present invention.
Figure 2B:
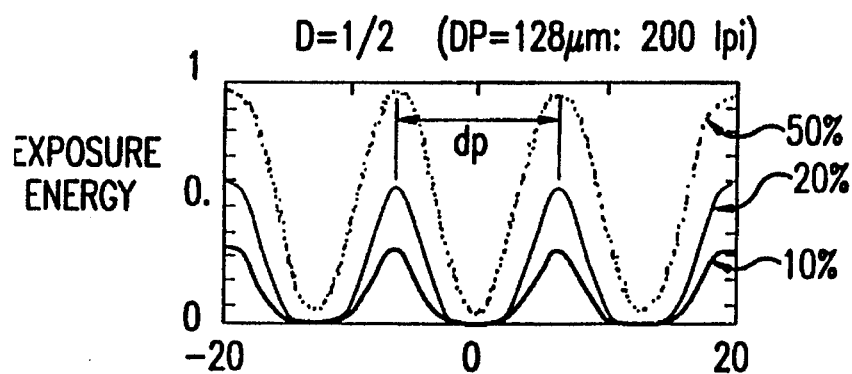
Figure 2C:
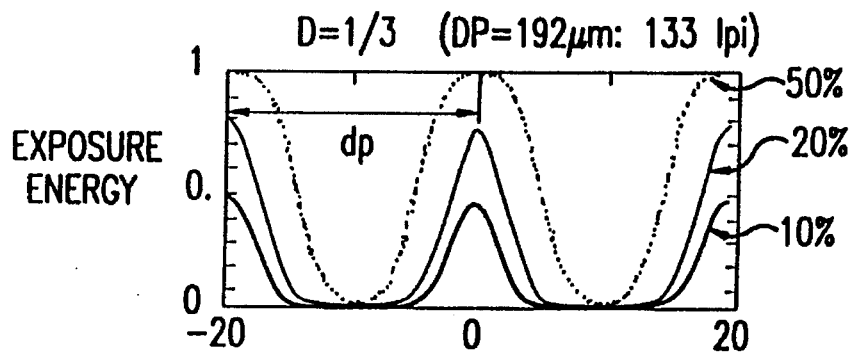

FIGS. 2(a), 2(b) and 2(c) show an example of the exposure energy profile when exposure is performed on the light-sensitive medium using light beam scanning means, an image-forming optical system and pulse width modulation means. It is assumed that a ratio of the spot diameter of the light beam $d_B$ to the distance (mm) between pixels adjacent to each other in the direction of main scanning $d_P$ is represented as D. FIGS. 2(a), 2(b) and 2(c) show the results in the cases where the spot diameter of the light beam $d_B$ (mm) is fixed and the distance (mm) between pixels $d_P$ is change and accordingly D is 1/1, 1/2 and 1/3, respectively.

In the electrophotographic method, a bias potential is applied in a developing process for preventing attachment of toner to blank portions. A border line (a broken line) corresponding to the bias potential is also added in FIGS. 2(a), 2(b) and 2(c) to indicate reverse development which develops exposed portions.

As it is clear from FIG. 2(a), as according to the reduction of the pulse width (%), the contrast of the exposure energy profile decreases and seems to be analog-like. An amount exceeding the border line corresponding to the bias potential reduces, and as a result, dots or lines cannot be reproduced.

As it can be seen from FIGS. 2(a), 2(b) and 2(c), if value of D is gradually reduced to be 1/1, 1/2, 1/3, deterioration of the contrast is well-restrained. Accordingly, if the spot diameter of the light beam $d_B$ is fixed, reproducibility of dots or lines and stability in reproduction of gradations and tones depending on environments are improved by decreasing the value of D by means of reducing the number of lines and increasing the distance between pixels adjacent to each other in the direction of main scanning $d_P$.

Figure 3A:
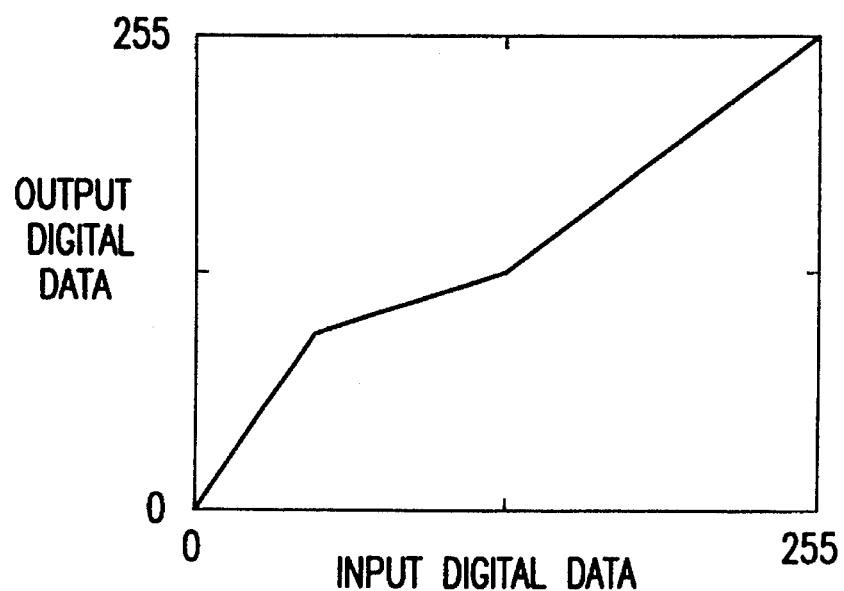
FIGS. 3(a) and 3(b) show data conversion properties of two lookup tables in the embodiments of the image forming apparatus according to the present invention.
Figure 3B:
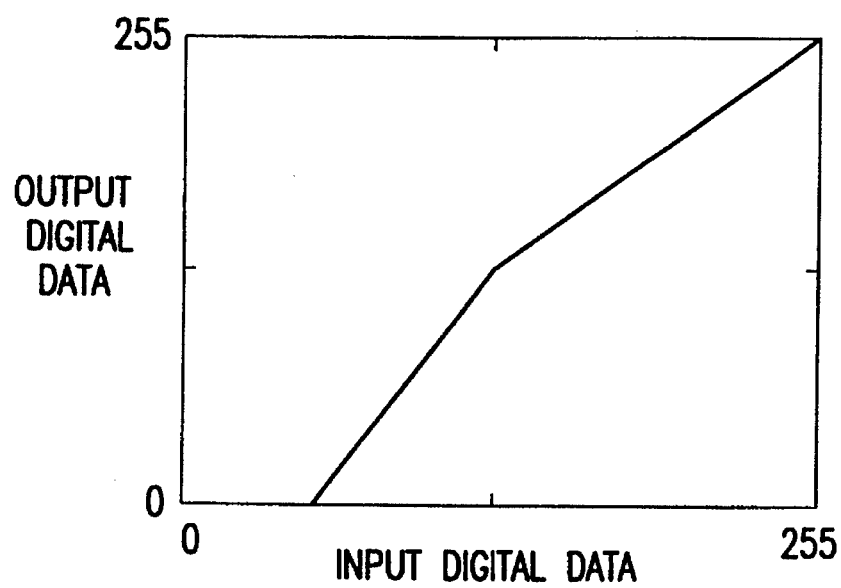

Based on the above consideration, the image forming apparatus according to the present invention practically reduces the number of lines in the low density portion by adding conversion to the image density signal. Image signal line-reduction conversion means for this purpose has at least image density signal conversion means having different properties as shown in FIGS. 3(a) and 3(b), for example. One of the conversion means has a property such that an output for the low density portion of the image density signal is 0 as shown in FIG. 3(b); therefore if the low density signal is input, there is no output. Another conversion means has a property such that if the low density signal is input, the conversion means outputs an output signal higher than usual value for the low density signal. These conversion means operate time-divisionally and periodically, which means that the input image signal for the low density portion is reduced at a regular intervals, that is, the pulse width modulation means reduces the number of lines in the low density portion and increases the number of lines in the middle-high density portion. Consequently, dots or lines in the low density portion are well-reproduced and stability in reproduction of gradations and tones depending on environments is increased.

In the above description, the property of the image density signal conversion means is explained on the assumption that one of the conversion means has a property such that an output for the low density portion is 0, for simplification.

Generally, in the electrophotographic device including light beam scanning, though the output of the conversion means is not 0, there are values within a range corresponding to portions where the electrostatic latent image is not developed because a laser diode does not emit when a small input signal is input, or the developing bias potential is applied to restrain attachment of toner to blank portions.

Figure 4A:
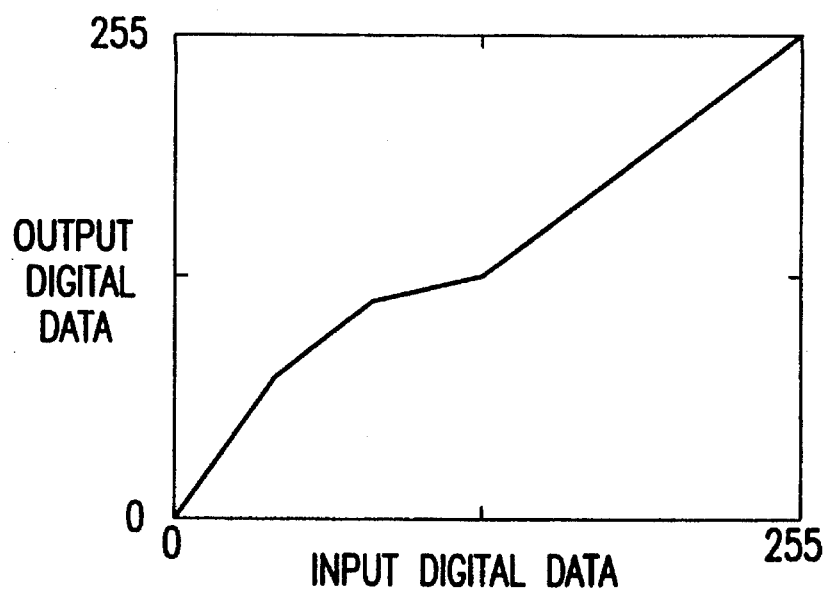
FIGS. 4(a) and 4(b) show other data conversion properties of two lookup tables in the embodiments of the image forming apparatus according to the present invention.
Figure 4B:
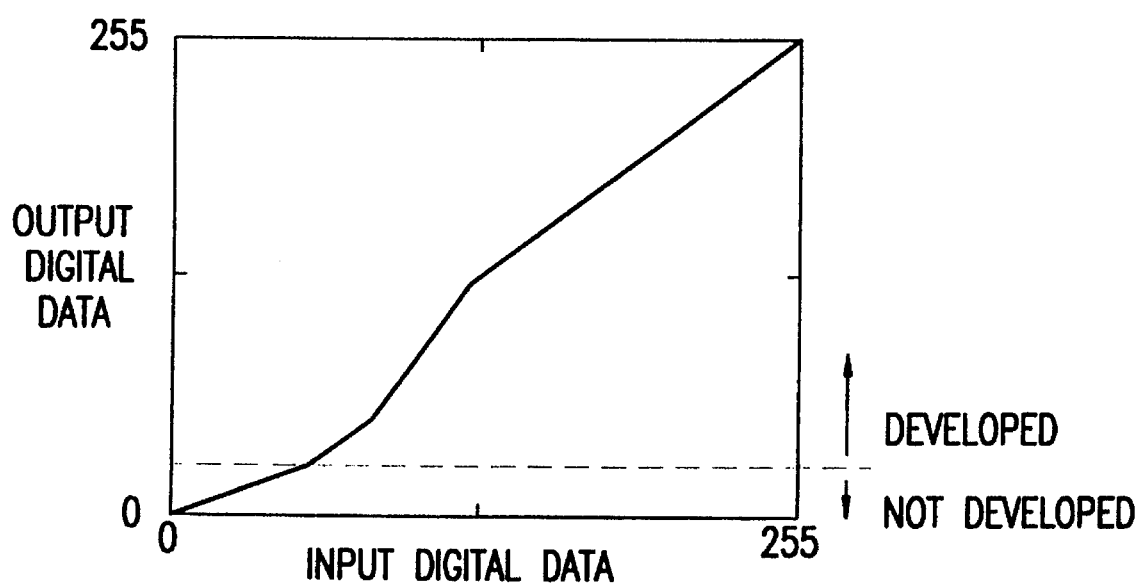

That is, it is not an absolute condition that one of the conversion means has a property to output 0 for the low density portion: the property of one of the conversion means, for example, may be that the output for the low density portion can be converted into a value within a range corresponding to portions where the electrostatic latent image is not developed as shown in FIGS. 4(a) and 4(b).

The main purpose of the image forming apparatus of the present invention is to realize line-reduction owing to the property of one of the conversion means that the conversion means outputs a value within a range corresponding to portions where the electrostatic latent image is not developed.

FIG. 5 shows an example of the results of visual comparison of images obtained by reproducing a high density line image, a low density line image, a high density natural image and a low density natural image with 400 line per inch (hereinafter, referred to as lpi), 200 lpi and 141 lpi in the case where the diameter of main scanning laser beam ($1/e^2$) is 64 μm. From FIG. 5, it is confirmed that sharpness is important with respect to the high density line image; therefore, reproduction with high recording density, namely, 400 lpi is desirable.

With respect to the low density line image, stability in reproduction of a character image with a minimum essential amount of toner is important as well as sharpness, and accordingly, reproduction with 200 lpi is most suitable.

For the low density natural image, stability in reproduction is important, and therefore, reproduction with 141 lpi is desirable.

With respect to the high density natural image, sharpness is important as well as stability in reproduction, so 200 lpi is most suitable to reproduce the image.

As described above, the most suitable number of lines is different in reproduction of the line image and the natural image.

Based on the result described above, pixels to be recorded are discriminated whether they constitute a line image or a natural image and a period of the pulse width modulation signal is selected in accordance with the result of determination for performing recording with the most suitable number of lines on purpose to improve reproducibility of both line image and natural image. In the case where the diameter of laser beam of main scanning ($1/e^2$) is set to be 64 μm, the pulse width modulation signal indicating 400 lpi is selected for the line image, and the pulse width modulation signal indicating 200 lpi is selected for the natural image.

Moreover, as previously described, at least two image density signal conversion means, one of which is set to output 0 for the low density portion, are time-divisionally and periodically, whereby the number of lines is reduced in the low density portion.

Accordingly, the high density line image is recorded with 400 lpi, and the low density line image is recorded with the number of lines smaller than 400 (for example, 200 lpi). The high density natural image is recorded with 200 lpi, and the low density natural image is recorded with the number of lines smaller than 200 (for example, 141 lpi), thus realizing well-reproduction of both line image and natural image.

Furthermore, in the present invention, the period of the pulse width modulation signal is changed to its integral multiple or integral reciprocal multiple. Therefore, as shown in FIG. 6, a boundary between the high density line image and the high density natural image is reproduced without blanks. That is, as shown in FIG. 6(a), if the ratio of period of the pulse width modulation signal for the large number of lines to the period of the pulse width modulation signal for the small number of lines is an integral ratio, in switching the modulation signals, the time for changing one of the pulse width modulation signals from on to off and another pulse width modulation signal from off to on is the same; consequently, interval of dots on boundary between the portions of a large number of lines and the small number of lines is always the same, whereby the printing dots are reproduced with the same density. To the contrary, in the case where the ratio of the period of pulse width modulation signal for the large number of lines to the period of pulse width modulation signal for the small number of lines is not an integral number, in switching the modulation signals, the time for changing one of the pulse width modulation signals from on to off and another pulse width modulation signal from off to on are always varied; therefore interval of dots on boundary between the portions of a large number of lines and the small number of lines is not constant. As a result, if switching of signals is carried out at a timing such that the interval of printing dots on the boundary is narrowed, the image of the part is reproduced with high density. If switching of signals is performed at a timing such that the interval of printing dots on the boundary is broadened, the image of the part is reproduced with low density or reproduced with blanks.

Thus, unevenness does not occur in reproducing image on the boundary between the high density line image and the high density natural image by setting the ratio of the period of pulse width modulation signal for the large number of lines to the period of pulse width modulation signal for the small number of lines to be an integral number.

Furthermore, in the present invention, a set of image density signals representing adjacent pixels (for example, four pixels constitute one group) is formed and it is determined whether both of line image and natural image exist in the group, that is, the period of pulse width modulation signal varies. If both of the line image and natural image exist, line-reduction is not performed. Therefore, well-conditioned line image can be obtained without deterioration of sharpness of boundary between the line image and the natural image.

Now preferred embodiment of an image forming apparatus according to the present invention is described in detail based on the drawings.

First Embodiment

Figure 7:
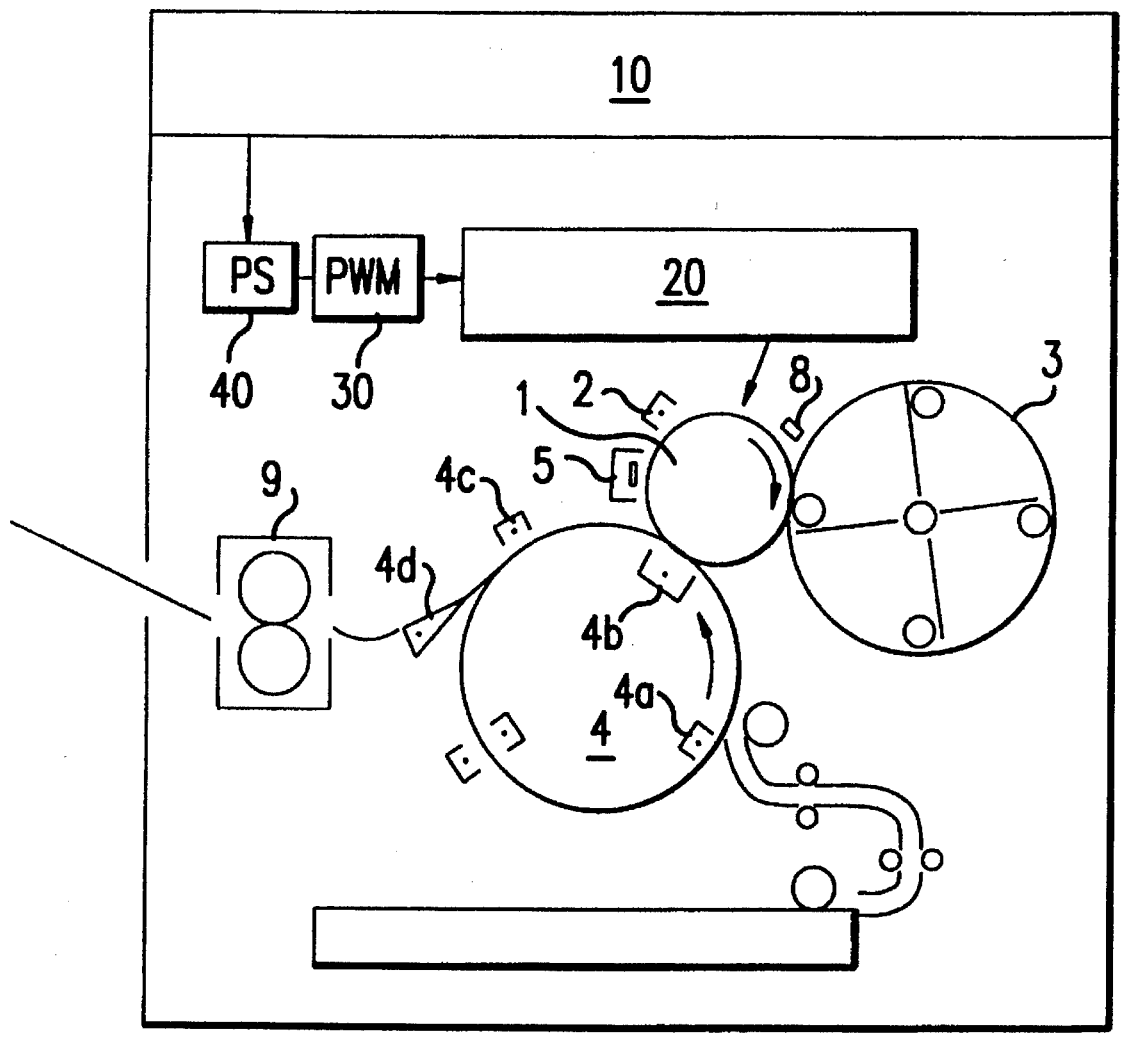
FIG. 7 shows a schematic construction of the first embodiment of the image forming apparatus according to the present invention.

FIG. 7 shows a schematic construction of the first embodiment of the image forming apparatus according to the present invention. Around a light-sensitive member 1 rotating in a direction indicated by an arrow, a charger 2, a light beam scanning device 20, a rotation developing device 3, a transfer drum 4 and a cleaner 5 or the like are disposed. Above them a document reading device 10, an image processing device 40 and a light beam pulse width modulation device 30 or the like are disposed.

The document reading device 10 reads the image density of the document. In the image processing device 40, processings such as gradation adjustment are provided to an image density signal indicating the image density having been read, and the signal is transmitted to the light beam pulse width modulation device 30.

The light-sensitive member 1 is uniformly charged by the charger 2 in a dark area. The light beam pulse width modulation device 30 performs on-off control in accordance with the image density signal supplied by the image processing device 40. The light beam scanning device 20 scans the light-sensitive member with the light beam, whereby exposure of the light-sensitive member 1 is carried out for forming an electrostatic latent image. The spot diameter of the light beam ($1/e^2$) in the direction of main scanning on the light-sensitive member 1 is set to be 42 μm.

As conventionally known, reproduction of low density portion of an image is important in designing image quality, and accordingly, it is necessary to reproduce at least 10% of pulse width. As it can be seen from FIG. 2, when the value of D is ½, dots or lines are not reproduced at all in 10% pulse width. When the value of D is ⅓, dots or lines are statically reproduced in 10% pulse width. Therefore, the value of D is set to be ⅓ or less, that is:

$$d_B \leq (\tfrac{1}{3})(d_P)$$

If the above inequality is satisfied, image reproduction in the low density portion is statically performed. Taking this condition into consideration, the above-described spot diameter is determined.

The rotation developing device 3 comprises four developing devices having toner of yellow, cyan, magenta and black, respectively. Each of four developing devices adopts the reverse developing method utilizing two-component magnetic brush development. Average diameter of toner used here is 7 μm. The rotation developing device 3 appropriately rotates to develop the electrostatic latent image with desirable color toner. At that time, a bias voltage is applied to the developing roller to prevent attachment of toner to blank portions.

The transfer drum 4 rotates with a recording sheet attaching to its peripheral surface. An image on the light-sensitive member 1 developed with toner is transferred to the recording sheet by a transfer corotron 4b. Formation, development and transfer of the electrostatic latent image is carried out for each of yellow, cyan, magenta and black. Toner on the recording sheet obtained by the above operations is fixed by a fixing device 9, thus forming a multi-color image.

Figure 8:
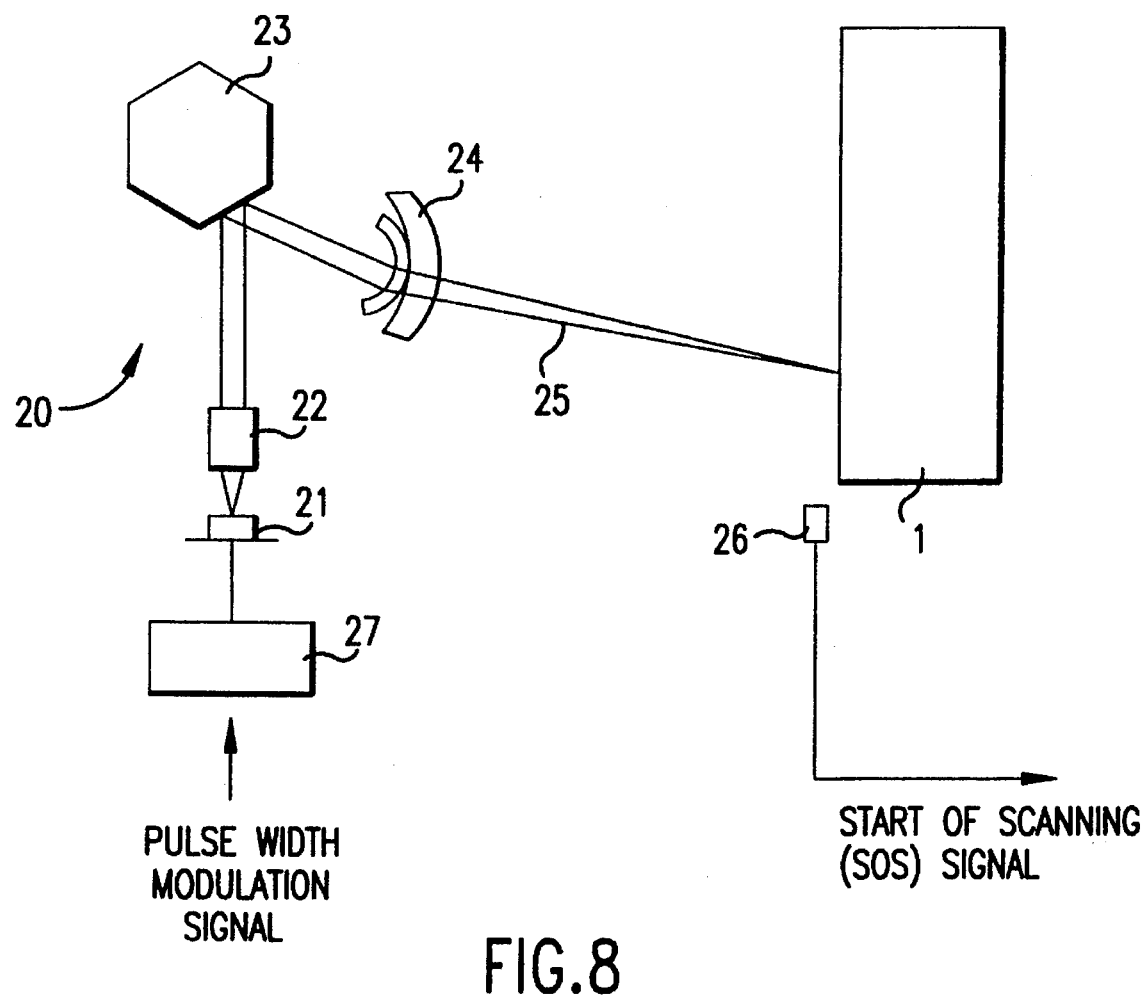
FIG. 8 shows an example of construction of a light beam scanning device of the first embodiment of the image forming apparatus according to the present invention.

FIG. 8 shows the light beam scanning device 20 in detail, which comprises a semiconductor laser 21, a collimator lens 22, a polygonal mirror 23 and an f-θ lens 24 or the like, and further has a start of scanning signal generation sensor 26 which generates a start of scanning (SOS) signal for detecting a timing of starting the light beam scanning. The semiconductor laser 21 carries out on-off control on the light beam in accordance with the pulse width modulation signal transmitted from the light beam pulse width modulation device 30.

Figure 1:
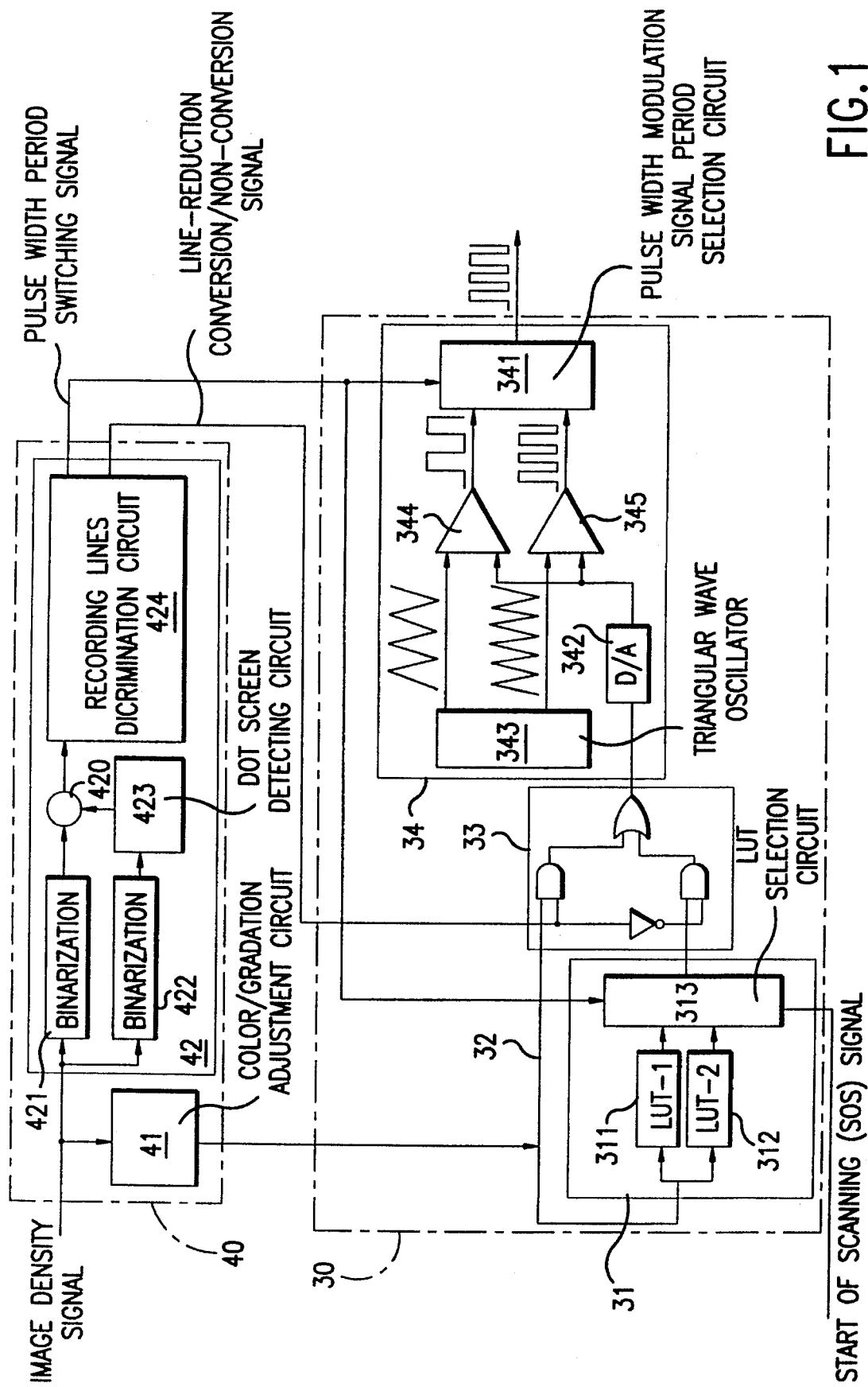
FIG. 1 shows constructions of pulse width modulation means and an image processing device of a first embodiment of an image forming apparatus according to the present invention.

FIG. 1 shows the light beam pulse width modulation device 30 and the image processing device 40 in detail. The light beam pulse width modulation device 30 comprises an image signal line-reduction conversion device 31, a non-conversion path 32, a line-reduction conversion/non-conversion selection circuit 33 and a pulse width modulation signal period changing device 34. The image signal line-reduction conversion device 31 comprises a first lookup table (LUT) 311, a second lookup table (LUT) 312 and an LUT selection device 313. The line-reduction conversion/non-conversion selection circuit 33 is a simple logic circuit. The pulse width modulation signal period changing device 34 comprises a pulse width modulation signal period selection circuit 341, a D/A converter 342, a triangular wave oscillator 343 and a pair of comparators 344 and 345.

The image processing device 40 comprises a color/gradation adjustment circuit 41 and a natural image/line image discrimination circuit 42. The natural image/line image discrimination circuit 42 further comprises a pair of binarization circuits 421 and 422, a dot screen detecting circuit 423 and a number of recording lines discrimination circuit 424.

Next, the flow of operations in which the pulse width modulation signal for on-off control of the light beam is generated based on the image density signal transmitted from the document reading device 10 is described.

The image density signal transmitted from the document reading device 10 is input to the color/gradation adjustment circuit 41 and the natural image/line image discrimination circuit 42. With respect to the image density signal input to the natural image/line image discrimination circuit 42, extraction of line image portions is carried out by the pair of binarization circuits 421 and 422, and dot screen detection circuit 423. The portions other than the line image portions are regarded as the natural image. Based on the result of natural image/line image determination, the number of recording lines discrimination circuit 424 outputs a pulse width period switching signal and a line-reduction conversion/non-conversion signal to the light beam pulse width modulation device 30. The pulse width period modulation signal serves for selecting the pulse width period suitable for each of the natural image and the line image, and for controlling selection of LUT to synchronize with the selected pulse width period. The line-reduction conversion/non-conversion signal functions to restrain line-reduction at the boundary portion between the natural image portion and the line image portion. In this embodiment, resolution of the image density signal is set to be 400 lpi. The pulse width period switching signal is set so that a pulse width modulation signal having a short period corresponding to 400 lpi is selected for the line image portion, and a pulse width modulation signal having a long period corresponding to 200 lpi is selected for the natural image portion. The line-reduction conversion/non-conversion signal refers to adjacent four pixels. If there is no switching of natural image/line image within four pixels, line-reduction conversion is carried out. On the other hand, if switching of natural image/line image exists among four pixels, no line-reduction conversion is performed.

Figure 9:
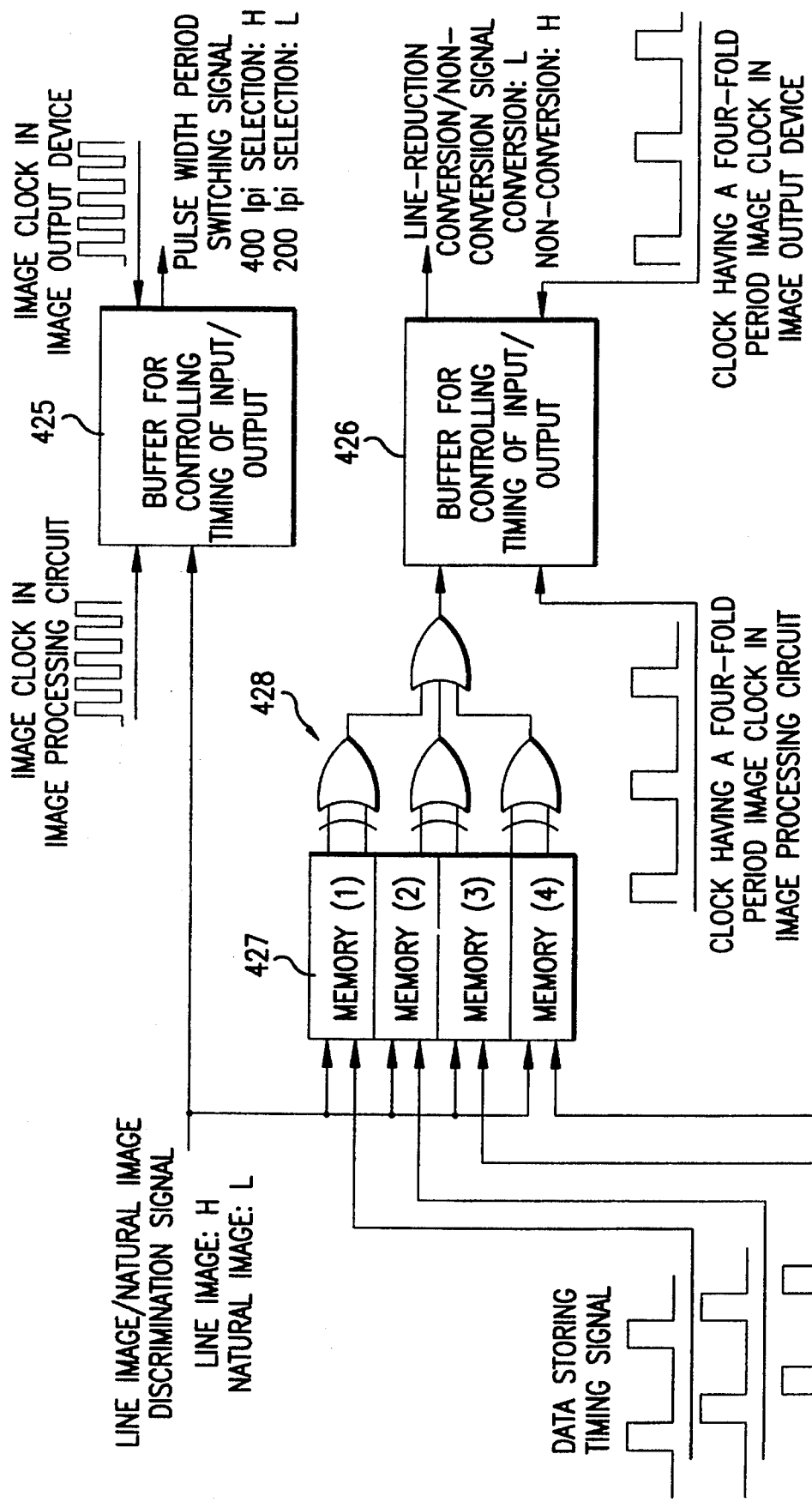
FIG. 9 shows an example of construction of a number of recording lines discrimination circuit.
Figure 10:
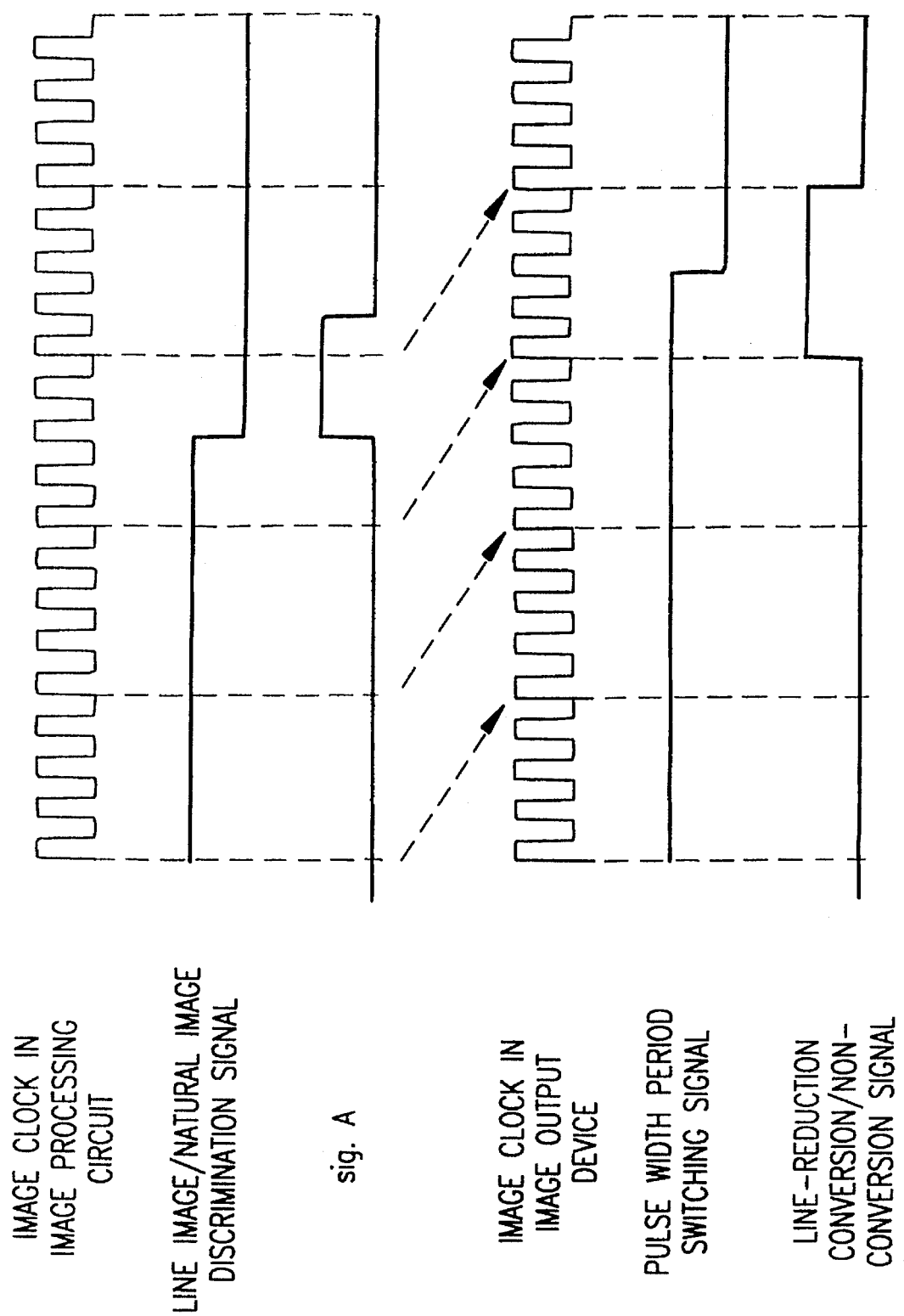
FIG. 10 shows a timing of operation of the number of recording lines discrimination circuit.

FIG. 9 shows the number of recording lines discrimination circuit 424 in detail and FIG. 10 shows its operation timing. The recording lines discrimination circuit 424 comprises a pair of buffers 425 and 426 controlling timing of input/output of data between the image processing device 40 and the pulse width modulation device 30, four memories 427 storing each of groups of four adjacent pixels in order, and a simple logic circuit 428.

Generation of the pulse width period switching signal and the line-reduction conversion/non-conversion signal with the above-described construction is now described in detail.

The image density signal input to the natural image/line image discrimination circuit 42 is binarized by the pair of binarization circuits 421 and 422. A portion of density exceeding a threshold value predetermined by the binarization circuit 421 is regarded as the line image, and 1 binary digits (referred to as H level) is output. Even in the natural image portion, a dot screen image exceeds the threshold value, and accordingly dot screens are detected by the dot screen detection circuit 423 and a subtracter 420 subtracts the output of the dot screen detection circuit 423 from the output of the binarization circuit 421. Therefore, the output of the subtracter 420 is H level only for the line image portion, and is input to the number of recording lines discrimination circuit 424. Here, the portions other than the line image portions, that is, portions for which the output is L level, are regarded as natural image portions. The natural image/line image discrimination signal is transmitted to the input/output timing controlling buffer 425 and memories 427 shown in FIG. 9.

The line image/natural image discrimination signal transmitted toward the input/output timing controlling buffer 425 is input to the buffer 425 synchronizing with an image clock in the image processing circuit. The buffer 425 controls timing of input/output of data between the image processing device 40 and the pulse width modulation device 30. In this embodiment, the data is output to the pulse width modulation device 30 with delay of four pixels synchronizing with the image clock in the image output device. The output signal is the pulse width switching signal, which is 400 dpi (H) for the line image and is 200 dpi (L) for the natural image.

The line image/natural image discrimination signals transmitted toward the memories 427 are input thereto in order synchronizing with data storing timing signals. A sig. A which represents H in the case where the line image/natural image discrimination signal changes from H to L or from L to H among adjacent four pixels and represents L in the case where no change is found is generated by the logic circuit 428. The sig. A is input to the input/output timing controlling buffer 426 synchronizing with a clock having a four-folds period of the image clock in the image processing device. The input/output timing controlling buffer 426 controls the timing of input/output of data between the image processing device 40 and the pulse width modulation device 30. In this embodiment, as same as the buffer 425, data is output to the pulse width modulation device 30 with delay of four pixels synchronizing with the clock having a four-folds period of the image clock in the image output device. This output signal is the line-reduction conversion/non-conversion signal which indicates L for conversion and H for non-conversion.

The image density signal input to the color and gradation adjustment circuit 41 is converted and adjusted in gradation in preparation of printing of color toner of yellow, cyan, magenta and black, and then transmitted to the light beam pulse width modulation device 30.

The image density signal transmitted toward the light beam pulse width modulation device 30 is distributed to the image signal line-reduction conversion device 31 and the non-conversion path 32.

The image density signal input to the image signal line-reduction conversion device 31 is converted by the pair of lookup tables 311 and 312. The converted image density signal is alternately selected by the LUT selection device 313. Here, if the pulse width period switching signal indicates the line image portion, the LUT selection device 313 selects LUT-1, LUT-2, LUT-1, LUT-2, LUT-1, LUT-2, . . . , synchronizing with the image density signal. In the case where the pulse width period switching signal indicates the natural image portion, the periods of LUT-1, LUT-1, LUT-2, LUT-2, LUT-1, LUT-1, LUT-2, LUT-2, . . . and LUT-2, LUT-2, LUT-1, LUT-1, LUT-2, LUT-2, LUT-1, LUT-1, . . . are alternately selected per every two laser scanning cycles synchronizing with the image density signal.

Figure 11:
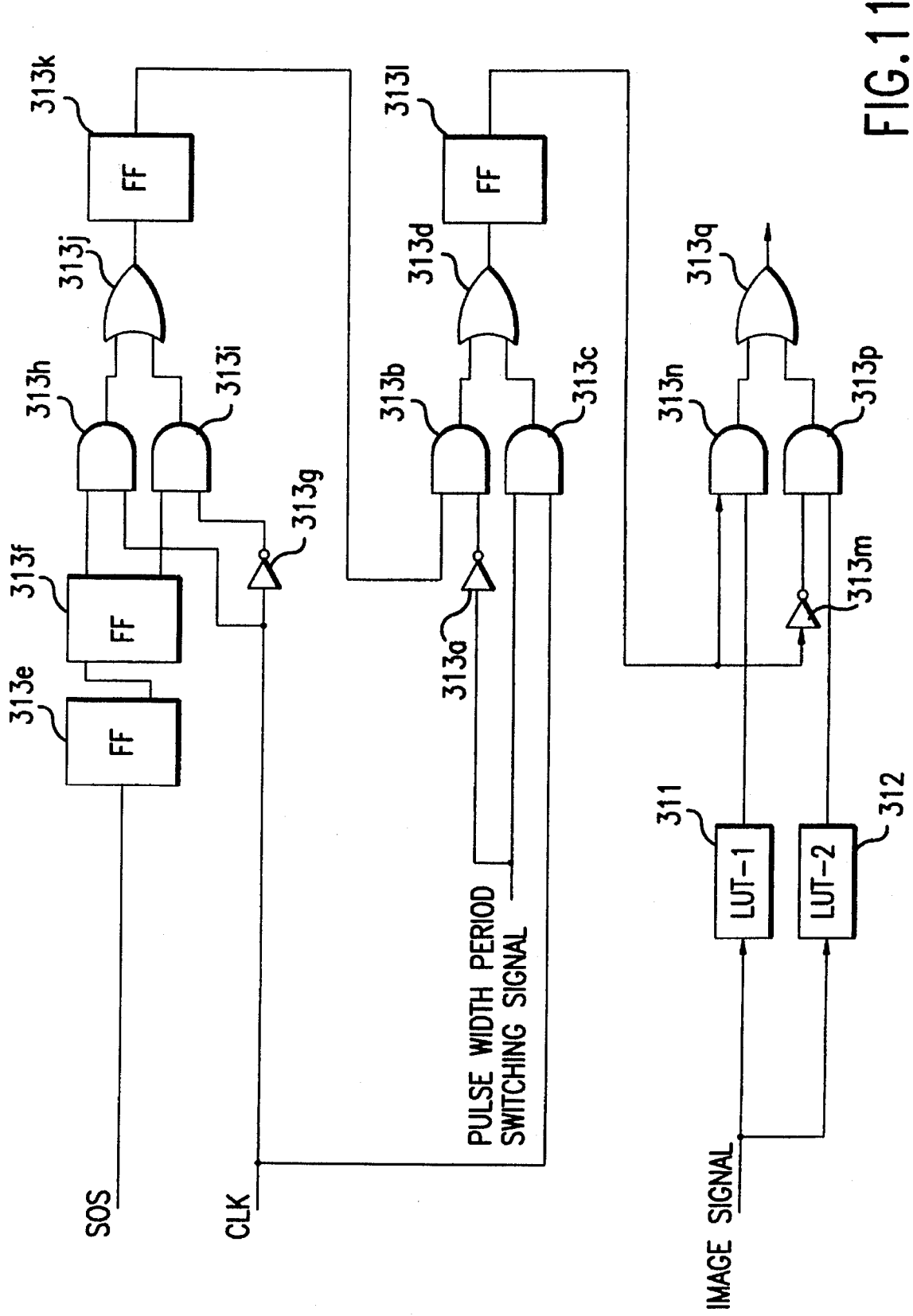
FIG. 11 shows an example of construction of an image signal line-reduction conversion device.

FIG. 11 shows a concrete construction of the image signal line-reduction conversion device 31. The logic circuit comprising logical element 313*a* through 313*d* has function to select a first selection control signal so that the first and second lookup tables are selected to be LUT-1, LUT-2, LUT-1, LUT-2, LUT-1, LUT-2 . . . . , on condition that the pulse width period switching signal is H level, and selects a second selection control signal so that the first and second lookup tables are selected in the periods of LUT-1, LUT-1, LUT-2, LUT-2, LUT-1, LUT-1, LUT-2, LUT-2, . . . and LUT-2, LUT-2, LUT-1, LUT-1, LUT-2, LUT-2, LUT-1, LUT-1 . . . alternately appearing per every two laser scanning cycles if the pulse width period switching signal is L.

Another logical circuit comprising logical elements 313*e* through 313*k* has function to generate the second selection control signal by reversing the phase of the image clock per every two inputs of start of scanning signals and doubling the period of the image clock.

The other logical circuit comprising logical elements 313*l* through 313*q* has function to select the outputs of the first and second lookup tables 311 and 312 by the first or second selection control signal.

In this embodiment, resolution of the image density signal is set to be 400 lpi. The lookup tables 311 and 312 have properties shown in FIGS. 3(*a*) and 3(*b*), and output of one of the lookup tables (here, LUT-2) for the input of the image density signal indicating low density is set to be 0, and for the input of the image density signal indicating high density is set, not to be 0, but to be printed. Therefore, the image density signal is converted so as to select 200 lpi for the low density line image, 400 lpi for the high density line image, 141 lpi for the low density natural image and 200 lpi for the high density natural image. Converted image density signal is transmitted to the line-reduction conversion/non-conversion selection circuit 33.

The line-reduction conversion/non-conversion selection circuit 33 selects one from the image density signal converted by line-reduction conversion output from the image density signal line-reduction conversion device 31 and the image density signal without conversion transmitted through the non-conversion path 32 in accordance with the instruction of the line-reduction conversion/non-conversion signal.

In this embodiment, the line-reduction conversion/non-conversion signal refers to adjacent four pixels. If there is no switching of natural image/line image among four pixels, line-reduction conversion is carried out. On the other hand, if switching of natural image/line image exists in four pixels, an instruction is made to perform no line-reduction conversion.

If the line-reduction conversion is instructed by the line-reduction conversion/non-conversion signal, the line-reduction conversion/non-conversion selection circuit 33 transmits the image density signal converted by line-reduction conversion output from the image density signal line-reduction conversion device 31 to the pulse width modulation signal period changing device 34. To the contrary, if no line-reduction conversion is instructed, the line-reduction conversion/non-conversion selection circuit 33 transmits the image density signal without conversion having been transmitted through the non-conversion path 32 to the pulse width modulation signal period changing device 34. Thus preventing line-reduction in the switching portion of line image/natural image and deterioration of sharpness of the line image.

The image density signal transmitted to the pulse width modulation signal period changing device 34 undergoes D/A conversion, and then transmitted to the pair of comparators 344 and 345. Here, size of the signal is compared with sizes of pulse width modulation reference signals having triangular waveform corresponding to 400 lpi and 200 lpi respectively, output by the triangular wave oscillator for being converted to the pulse width modulation signals corresponding to 400 lpi and 200 lpi. The pulse width modulation signal period selection circuit 341 selects either 400 lpi pulse width modulation signal or 200 lpi pulse width modulation signal in accordance with the pulse width period switching signal.

By above-described selection, the pulse width modulation signal which indicates 200 lpi for the low density line image, 400 lpi for the high density line image, 141 lpi with screen angle of 45° for the low density natural image and 200 lpi for the high density natural image is generated. The ratio of the periods of two pulse width modulation signals is 1:2, that is, the ratio is represented by integral numbers. Owing to the integral ratio, the boundary portion of natural image/line image can be reproduced without blanks as shown in FIG. 6(*a*). That is, if the ratio of period of the pulse width modulation signal for the large number of lines to the period of the pulse width modulation signal for the small number of lines is an integral ratio, in switching the modulation signals, the time for changing one of the pulse width modulation signals from on to off and another pulse width modulation signal from off to on is the same; consequently, interval of dots on boundary between the portions of a large number of lines and the small number of lines is always the same, whereby the printing dots are reproduced with the same density. To the contrary, in the case where the ratio of the period of pulse width modulation signal for the large number of lines to the period of pulse width modulation signal for the small number of lines is not an integral number as shown in FIG. 6(*b*), in switching the modulation signals, the time for changing one of the pulse width modulation signals from on to off and another pulse width modulation signal from off to on are always varied; therefore interval of dots on boundary between the portions of a large number of lines and the small number of lines is not constant. As a result, if switching of signals is carried out at a timing such that the interval of printing dots on the boundary is narrowed, the image of the part is reproduced with high density. If switching of signals is performed at a timing such that the interval of printing dots on the boundary is broadened, the image of the part is reproduced with low density or reproduced with blanks.

As described above, by controlling the ratio of the period of pulse width modulation signal for the large number of lines to the period of pulse width modulation signal for the small number of lines to be an integral ratio, unevenness does not occur on the boundary between the high density line image and the high density natural image.

Generated pulse width modulation signal is transmitted to a laser diode (LD) driver of the light beam scanning device 20. In accordance with the signal, on-off control of the light beam is performed to form an image.

Next, processing operations of the embodiment is described utilizing an image example.

FIG. 12 shows an example of arrangements of recording dots in the low density line image and the high density line image. In the figure, Table 121 shows an example of a low density line image density signal and each of small frames indicates pixel density. In this example, density of each pixel is represented as gradation level of 10 (16 digits). Table 122 shows an example of high density line image density signal, wherein density of each pixel is gradation level of B0 (16 digits). Table 123 shows the state of selection of the lookup table when it is determined that the density signal indicates the line image, and the LUT selection device 313 selects LUT-1, LUT-2, LUT-1, LUT-2, LUT-1, LUT-2, . . . synchronizing with the image density signal in every scanning line. In the case of the low density image in which all the line image density signals are gradation of 10 (16 digits) as shown in Table 121, if the first lookup table (LUT-1) is selected, its property is as shown in FIG. 3(*a*), that is, the output data has a value other than 0 for the gradation 10; accordingly, dots are recorded by image formation. If the second lookup table (LUT-2) is selected, its property is as shown in FIG. 3(*b*), that is, the output data for the gradation 10 is 0, and accordingly dots are not recorded by image formation. In the case of the LUT selection shown in Table 123 for the low density line image density signal shown in Table 121, dots are not recorded in portions where the second lookup table (LUT-2) is selected, as shown in an image 124 of FIG. 12; therefore, the number of dots are reduced as a whole, thus performing line-reduction (in this embodiment, reduced to be 200 lpi).

In the case of the LUT selection shown in Table 123 for the high density line image density signal shown in Table 122, all dots are recorded as shown in an image 125 because both LUT-1 and LUT-2 have properties to output other than 0 for the high density portion; therefore line-reduction is not carried out (in this embodiment, the number of lines is 400).

FIG. 13 shows an example of arrangement of recording dots of the low density natural image and the high density natural image formed by the present embodiment. In the figure, Table 131 shows an example of the low density natural image density signal, wherein each of small frames indicates the density of the pixel, and in the example, density of all pixels is gradation level of 10 (16 digits). Table 132 shows an example of the high density natural image density signal, wherein density of all pixels is gradation level of B0 (16 digits). Table 133 shows the state of selection of the lookup table when it is determined that the density signal indicates the natural image, and the LUT selection device 313 selects the periods of LUT-1, LUT-1, LUT-2, LUT-2, LUT-1, LUT-1, LUT-2, LUT-2, . . . and LUT-2, LUT-2, LUT-1, LUT-1, LUT-2, LUT-2, LUT-1, LUT-1, . . . alternately switching in every two laser scanning cycles. As shown in Table 131, in the case of the the low density image in which all of the natural image density signals are gradation of 10 (16 digits), if the first lookup table (LUT-1) is selected, its property is as shown in FIG. 3(*a*), that is, the output data has a value other than 0 for the gradation 10; accordingly dots are recorded by image formation. If the second lookup table (LUT-2) is selected, its property is as shown in FIG. 3(*b*), that is, the output data for the gradation 10 is 0; accordingly, dots are not recorded by image formation. In the case of the natural image, time for selecting lookup table is twice as long as that of the line image, and therefore the period of selection is reversed per every two scanning periods. For this reason, in the case of LUT selection shown in Table 133 for the low density natural image density signals shown in Table 131, dots of the low density natural image are recorded as shown in an image 134 in FIG. 13 wherein there are no recording dots in the portions where the second lookup table (LUT-2) is selected. Therefore, the number of dots is largely reduced and dots are alternately formed in both of the main scanning direction and the sub scanning direction so as to form a stagger arrangement, whereby line-reduction is carried out (in this embodiment, 141 lpi).

On the other hand, in the case of LUT selection shown in Table 133 for the high density natural image density signals shown in Table 132, all dots are recorded as shown in an image 135 because both LUT-1 and LUT-2 have properties to output other than 0 for the high density portion; therefore line-reduction by lookup table is not carried out (in this embodiment, the number of lines is 200).

Consequently, the number of recording lines is 200 for the low density lie image, 400 for the high density line image, 141 for the low density natural image and 200 for the high density natural image. FIG. 5 shows a result of visual comparison of reproduction of the line image and the natural image with 400 lpi, 200 lpi and 141 lpi. It can be understood that both line image and natural image are well-reproduced according to the present invention.

Figure 14:
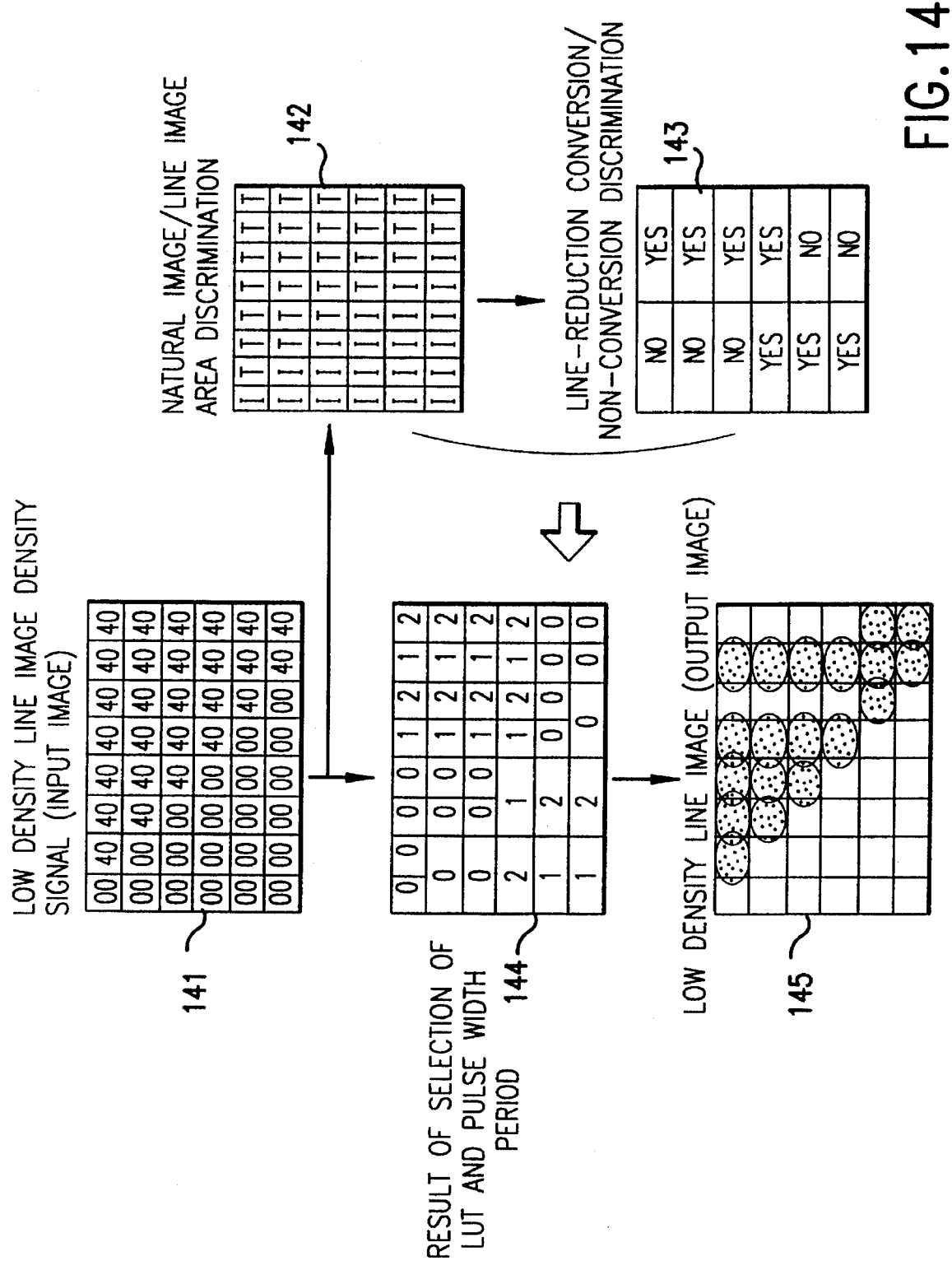
FIG. 14 shows recording dots in a portion including a boundary between the line image and the natural image in the first embodiment of the image forming apparatus according to the present invention.

FIG. 14 shows an example of arrangement of recording dots in switching portion between the natural image and the line image. Table 141 shows the low density line image density signals including boundary portion between the low density, line image (density of pixels are gradation level of 40 (16 digits)) and the natural image (density of pixels are gradation level of 10 (16 digits)). the result of line image/natural image discrimination for this density signal carried out by the natural image/line image discrimination circuit 42 is shown in Table 142 wherein "I" indicates the pixel determined to belong to the natural image area and "T" indicates the pixel determined to belong to the line image area. A group of adjacent four signals in the discrimination result in Table 142 is input to the memories 427. In the case where both I and T exist in the group, it is determined not to perform line-reduction conversion, and in other cases, determined to perform line-reduction conversion. The result of determination is shown in Table 143. Table 144 shows results of selection of LUT and pulse width period in accordance with results of natural image/line image discrimination and line-reduction conversion/non-conversion determination, wherein the area including no line-reduction conversion is represented as 0, and selection of LUT is represented as 1 and 2. In the area consisting only of the low density line image, two lookup tables are alternately selected in the same way as the selection of LUT shown in FIG. 12. In the area consisting only of the natural image, in the same way as selection of LUT in FIG. 13, two lookup tables are alternately selected with a period twice as long as that of the line image in every two scanning period. In an image 145, output after the above-described processings, well-conditioned line image can be obtained without deterioration of sharpness in the boundary portion between the line image and the natural image.

Second Embodiment

In the image signal line-reduction conversion device 31 of the first embodiment, if the pulse width period switching signal indicates the natural image portion, the LUT selection device 313 selects LUT with the alternate periods of LUT-1, LUT-1, LUT-2, LUT-2, LUT-1, LUT-1, LUT-2, LUT-2, . . . and LUT-2, LUT-2, LUT-1, LUT-1, LUT-2, LUT-2, LUT-1, LUT-1, . . . , switched in every two laser scanning cycles.

A second embodiment does not switch the LUT selection period in every two laser scanning cycles, but switches the selection with the periods of LUT-1, LUT-1, LUT-2, LUT-2, LUT-1, LUT-1, LUT-2, LUT-2, . . . and LUT-2, LUT-2, LUT-1, LUT-1, LUT-2, LUT-2, LUT-1, LUT-1, . . . in every one laser scanning cycle. This can be realized by removing flip-flop 313e from the circuit of the image signal line-reduction conversion device 31 in FIG. 11.

FIGS. 12 and 15 show examples of arrangements of recording dots in the low density natural image and the high density natural image formed by the second embodiment. There is no difference in the high density natural image from the first embodiment. With respect to the low density natural image, stability in reproduction as same as the first embodiment can be obtained because intervals between dots are the same as those of the first embodiment. The characteristic of the second embodiment lies in the number of recording lines larger than 141, which make it harder to detect the image construction (screen construction) by visual observation, thus achieving the smooth image reproduction.

Third Embodiment

The first embodiment has a single image signal line-reduction conversion device 31 and the same lookup tables are used for both of the natural image and the line image.

Figure 16:
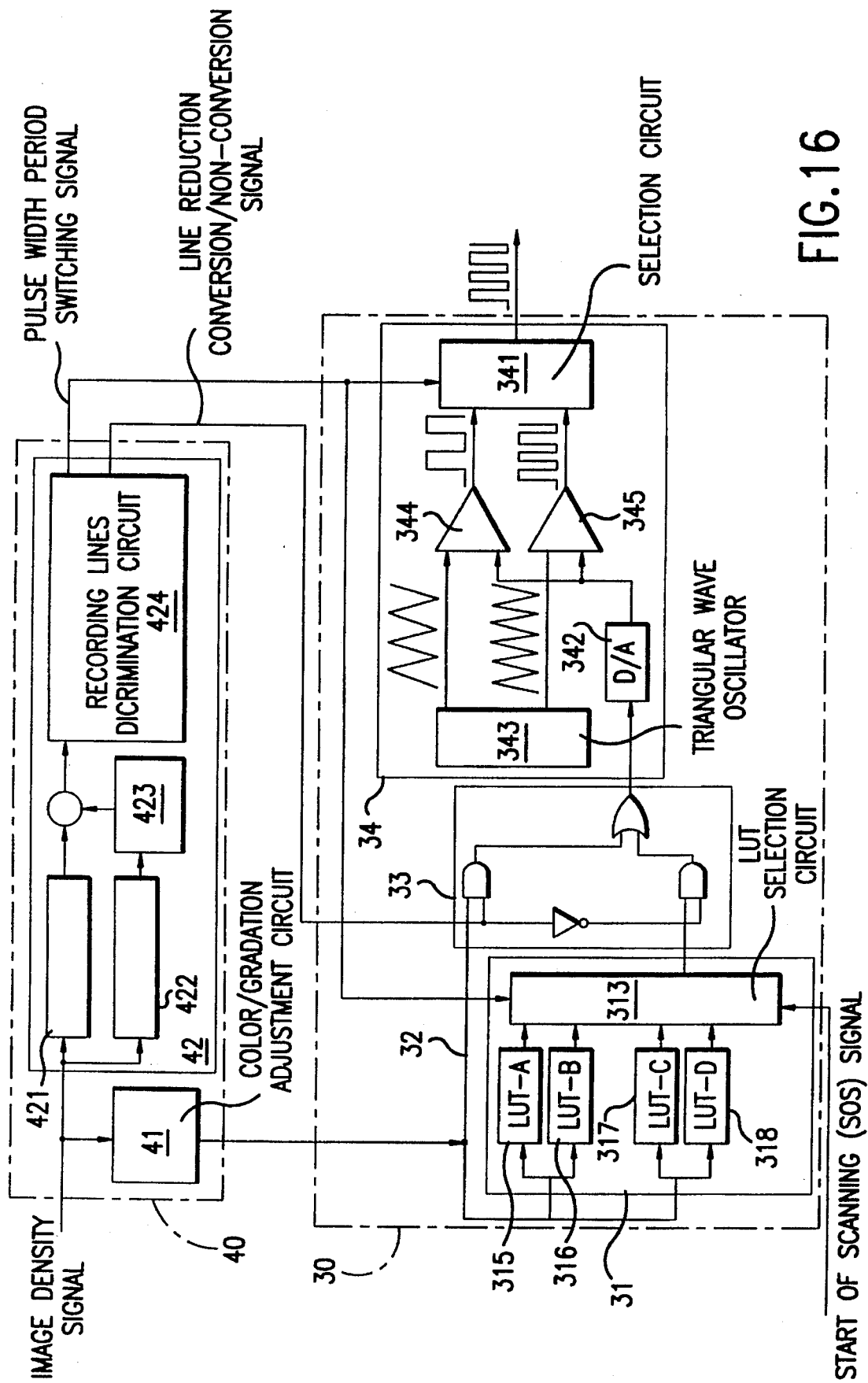
FIG. 16 shows constructions of pulse width modulation means and an image processing device of a third embodiment of the image forming apparatus according to the present invention.
Figure 17A:
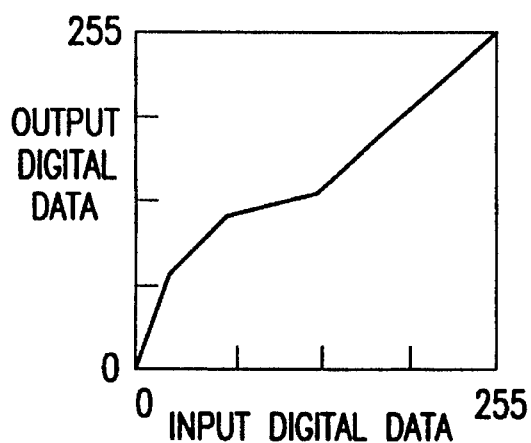
FIGS. 17(a) through 17(d) show data conversion properties of a pair of two lookup tables in the third embodiment of the image forming apparatus according to the present invention.
Figure 17B:
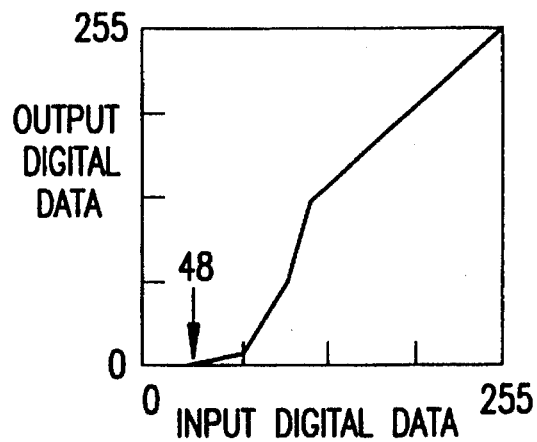
Figure 17C:
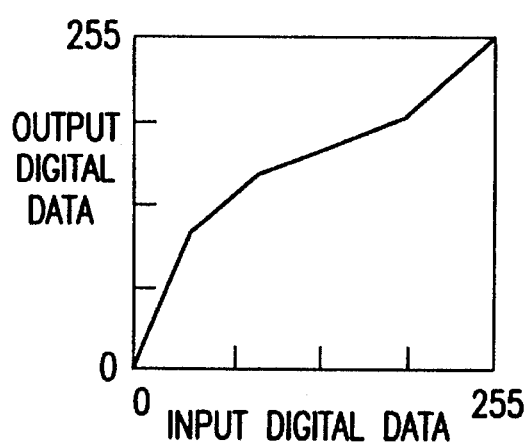
Figure 17D:
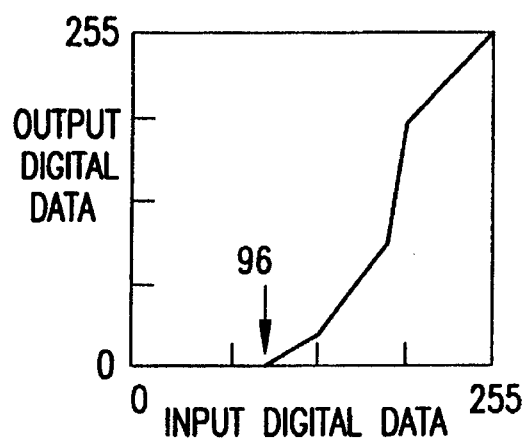

Third embodiment, as shown in FIG. 16, comprises lookup tables 315 and 316 (LUT-A and LUT-B) for the natural image and lookup tables 317 and 318 (LUT-C and LUT-D) for the line image. Each of the lookup tables has a property shown in FIGS. 17(a) through 17(d). The lookup tables LUT-B and LUT-D are set to have a property to output 0 for the input of the low density signal. To describe in detail, LUT-B is set to output 0 for the input data having a value of 32 or less and LUT-D is set to output 0 for the input data having a value of 96 or less.

If the pulse width period switching signal indicates the natural image portion, the lookup tables for the natural image, LUT-A and LUT-B, are selected in the same way as those of the first embodiment, that is, the selections LUT-A, LUT-A, LUT-B, LUT-B, LUT-A, LUT-A, LUT-B, LUT-B, . . . and LUT-B, LUT-B, LUT-A, LUT-A, LUT-B, LUT-B, LUT-A, LUT-A, . . . are switched per every one laser scanning cycle or two laser scanning cycles.

In the case where the pulse width period switching signal indicates the line image portion, the lookup tables for the line image, LUT-C and LUT-D are selected as same as the first embodiment, that is, LUT-C, LUT-D, LUT-C, LUT-D, LUT-C, LUT-D, LUT-C, LUT-D, . . .

In general, the line image is reproduced with higher density than the natural image. For example, in the natural image, input data from 0 to 192 are mainly used. On the other hand, in the line image, input data from 64 to 256 are mostly used. In the third embodiment, difference in ranges of input data used for the line image and the natural image is taken into consideration, and accordingly, image reproduction is performed utilizing lookup tables suitable for the natural image and the line image, respectively. Therefore, both of the natural image and the line image can be reproduced more excellently than in the first embodiment.

According to the present invention, it is possible to carry out image formation with the number of recording lines which is the most suitable for each of the high density line image, the low density line image, the high density natural image and the low density natural image. It is also possible to form an image without deterioration of sharpness in the boundary portion between the natural image and the line image; consequently, well-conditioned reproduction of both of the natural image and the line image can be achieved.

The foregoing description of preferred embodiments of this invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image forming apparatus comprising:

image signal discrimination means for discriminating whether an image density signal belongs to a line image portion or a natural image portion including a halftone image and outputting a discrimination signal;

first image density conversion means having a first conversion property for converting said image density signal to a conversion signal and outputting said conversion signal;

second image density conversion means having a second conversion property which is different from said first conversion property for converting a part of said image density signal corresponding to a low density portion to a conversion signal indicating a value within a range in which an image is not developed and outputting said conversion signal;

selection means for alternately selecting said first or second image density conversion means with a predetermined period;

pulse width modulation means for modulating pulse widths of said conversion signals output from said first and second image density signal conversion means and outputting a pulse width modulation signal;

pulse width modulation signal period changing means for changing a period of said pulse width modulation signal output from said pulse width modulation means and the period of selection by said selection means in accordance with said discrimination signal output from said image density signal discriminating means; and image formation means for forming an image in accordance with said pulse width modulation signal output from said pulse width modulation means.

2. The image forming apparatus according to claim 1, wherein said first conversion property converts a part of said image density signal corresponding to a low density portion to a conversion signal indicating a value within a range in which an image is developed.

3. The image forming apparatus according to claim 1, wherein said pulse width modulation signal period changing means changes the period of said pulse width modulation signal to an integral multiple of said period.

4. The image forming apparatus according to claim 1, wherein said pulse width modulation signal period changing means changes the period of said pulse width modulation signal to an integral reciprocal multiple of said period.

5. The image forming apparatus according to claim 1, wherein said image formation means comprises:
light beam scanning means for relatively scanning a light-sensitive medium with a light beam;
an image-forming optical system for converging the light beam scanned by said light beam scanning means and forming a light beam spot of a predetermined size on said light-sensitive medium; and
values $d_B$ and $d_P$ having the following relation $$d_B \leq (\tfrac{1}{3})d_P,$$

where $d_P$ (mm) is a distance between said light beam spots adjacent to each other in a main scanning direction on said light-sensitive medium and $d_B$ (mm) is a diameter of said light beam spot in the main scanning direction in the case of forming an image when said conversion signal indicates a value within a range in which said image is not developed.

6. The image forming apparatus according to claim 2, wherein said image formation means comprises:
light beam scanning means for relatively scanning a light-sensitive medium with a light beam;
an image-forming optical system for converging the light beam scanned by said light beam scanning means and forming a light beam spot of a predetermined size on said light-sensitive medium; and
values $d_B$ and $d_P$ having the following relation $$d_B \leq (\tfrac{1}{3})d_P,$$

where $d_P$ (mm) is a distance between said light beam spots adjacent to each other in a main scanning direction on said light-sensitive medium and $d_B$ (mm) is a diameter of said light beam spot in the main scanning direction in the case of forming an image when said conversion signal indicates a value within a range in which said image is not developed.

7. An image forming apparatus comprising:
image signal discrimination means for discriminating whether an image density signal belongs to a line image portion or a natural image portion including a halftone image and outputting a discrimination signal;
first image density conversion means having a first conversion property for converting said image density signal to a conversion signal and outputting said conversion signal;
second image density conversion means having a second conversion property which is different from said first conversion property for converting a part of said image density signal corresponding to a low density portion to a conversion signal indicating a value within a range in which an image is not developed and outputting said conversion signal;
selection means for alternately selecting said first or second image density conversion means with a predetermined period;
pulse width modulation means for modulating pulse widths of said conversion signals output from said first and second image density signal conversion means and outputting a pulse width modulation signal;
conversion/non-conversion discrimination means for determining whether conversions of each group of adjacent image density signals by said first and second image density signal conversion means are carried out;
signal selection means for selecting one from an output after conversions of each group of said image density signals by said first and second image density signal conversion means and an output without conversion of each group of said image density signals by said first and second image density signal conversion means in accordance with a result of determination of said conversion/non-conversion discrimination means;
pulse width modulation signal period changing means for changing a period of said pulse width modulation signal output from said pulse width modulation means and the period of selection carried out by said selection means in accordance with said discrimination signal output from said image density signal discriminating means; and
image formation means for forming an image in accordance with said pulse width modulation signal output from said pulse width modulation means.

8. The image forming apparatus according to claim 7, wherein said first conversion property converts a part of said image density signal corresponding to a low density portion to a conversion signal indicating a value within a range in which an image is developed.

9. The image forming apparatus according to claim 7, wherein said conversion/non-conversion discrimination means determines whether conversions by said first and second image density signal conversion means are carried out in accordance with a result of discrimination of said image signal discrimination means.

10. The image forming apparatus according to claim 8, wherein said conversion/non-conversion discrimination means determines whether conversions by said first and second image density signal conversion means are carried out in accordance with a result of discrimination of said image signal discrimination meas.

11. The image forming apparatus according to claim 9, wherein conversions by said first and second image density signal conversion means are not carried out on condition that said group of adjacent image density signals includes an image density signal belonging to a line image portion and an image density signal belonging to a natural image portion including a halftone image.

12. The image forming apparatus according to claim 10, wherein said conversion/non-conversion discrimination means determines whether conversions by said first and second image density signal conversion means are carried out based on a result of discrimination of said image signal discrimination means.

13. The image forming apparatus according to claim 7, wherein said pulse width modulation signal period changing means changes the period of said pulse width modulation signal to an integral multiple of said period.

14. The image forming apparatus according to claim 7, wherein said pulse width modulation signal period changing means changes the period of said pulse width modulation signal to an integral reciprocal multiple of said period.

15. The image forming apparatus according to claim 7, wherein said image formation means comprises:
light beam scanning means for relatively scanning a light-sensitive medium with a light beam;
an image-forming optical system for converging the light beam scanned by said light beam scanning means and forming a light beam spot of a predetermined size on said light-sensitive medium; and values $d_B$ and $d_P$ having the following relation $$d_B \leq (\tfrac{1}{3})d_P,$$

where $d_P$ (mm) is a distance between said light beam spots adjacent to each other in a main scanning direction on said light-sensitive medium and $d_B$ (mm) is a diameter of said light beam spot in the main scanning direction in the case of forming an image when said conversion signal indicates a value within a range in which said image is not developed.

16. The image forming apparatus according to claim 8, wherein said image formation means comprises:
   light beam scanning means for relatively scanning a light-sensitive medium with a light beam;
   an image-forming optical system for converging the light beam scanned by said light beam scanning means and forming a light beam spot of a predetermined size on said light-sensitive medium; and
   values $d_B$ and $d_P$ having the following relation $$d_B \leq (\tfrac{1}{3})d_P,$$

where $d_P$ (mm) is a distance between said light beam spots adjacent to each other in a main scanning direction on said light-sensitive medium and $d_B$ (mm) is a diameter of said light beam spot in the main scanning direction in the case of forming an image when said conversion signal indicates a value within a range in which said image is not developed.

17. An image forming apparatus comprising:
   image signal discrimination means for discriminating whether an image density signal belongs to a line image portion or a natural image portion including a halftone image and outputting a discrimination signal;
   first line-reduction conversion means having first image density conversion means having a first conversion property for converting said image density signal to a conversion signal and outputting said conversion signal and second image density conversion means having a second conversion property which is different from said first conversion property for converting a part of said image density signal corresponding to a low density portion to a conversion signal indicating a value within a range in which an image is not developed and outputting said conversion signal;
   second line-reduction conversion means having third image density conversion means having a third conversion property for converting said image density signal to a conversion signal and outputting said conversion signal and fourth image density conversion means having a fourth conversion property which is different from said third conversion property for converting a part of said image density signal corresponding to a low density portion to a conversion signal indicating a value within a range in which an image is not developed and outputting said conversion signal;
   first selection means for alternately selecting said first or second image density conversion means and said third or fourth image density conversion means in a predetermined period;
   pulse width modulation means for modulating pulse widths of said conversion signals output from said first and second line-reduction conversion means and outputting a pulse width modulation signal;
   pulse width modulation signal period changing means for changing a period of said pulse width modulation signal output from said pulse width modulation means and the period of selection carried out by said first selection means in accordance with said discrimination signal output from said image signal discrimination means;
   second selection means for selecting one from said first line-reduction conversion means and said second line-reduction conversion means in accordance with said discrimination signal output from said image signal discrimination means; and
   image formation means for forming an image in accordance with said pulse width modulation signal output from said pulse width modulation means.

18. The image forming apparatus according to claim 17, wherein said first conversion property and said third conversion property are different from each other.

19. The image forming apparatus according to claim 17, wherein said first conversion property and said third conversion property are approximately the same.

20. The image forming apparatus according to claim 17, wherein said first conversion property and said third conversion property convert a part of said image density signal corresponding to a low density portion to a conversion signal indicating a value within a range in which an image is developed.

* * * * *